INVENTORS
GEORGE J. MOSS, JR.
ROBERT W. HAVEY, JR.
JOHN M. SAUNDERS

INVENTORS
GEORGE J. MOSS, JR.
ROBERT W. HAVEY, JR.
JOHN M. SAUNDERS

INVENTORS
GEORGE J. MOSS, JR.
ROBERT W. HAVEY, JR.
JOHN M. SAUNDERS

BY
ATTORNEY

INVENTORS
GEORGE J. MOSS, JR.
ROBERT W. HAVEY, JR.
JOHN M. SAUNDERS

ATTORNEY

United States Patent Office 3,500,302
Patented Mar. 10, 1970

3,500,302
SONAR BATHYMETRY SYSTEM TRANSMIT-RECEIVE SEQUENCE PROGRAMMER
George J. Moss, Jr., Bethesda, and Robert W. Havey, Jr., Suitland, Md., and John M. Saunders, Alexandria, Va., assignors to the United States of America as represented by the Secretary of the Navy
Filed Jan. 13, 1969, Ser. No. 790,686
Int. Cl. G01s 9/68
U.S. Cl. 340—3
4 Claims

ABSTRACT OF THE DISCLOSURE

Depth information from a sonar system in the form of a plurality of digital outputs, each representing a 400 fathom depth increment, is coupled to an AND logic bank. The AND logic bank also receives the output from a shift register which functions as a memory circuit for sonar pulses transmitted by the sonar system. The output of the AND logic bank is a signal indicative of when a return echo from the bottom of the ocean is expected. This signal is fed to the programmer logic bank which analyzes the received information and, upon keying by a timing pulse from the sonar system, sends out a signal which will actuate either the sonar receiver or the sonar transmitter so that the minimum echo misinterpretation error and the maximum depth information will be provided.

Statement of Government interest

The invention described herein may be manufactured and used by or for the Government of the United States of America for governmental purposes without the payment of any royalties thereon or therefor.

BACKGROUND OF THE INVENTION

The present invention relates to bathymetry systems and more particularly to a sonar bathymetry programmer for optimizing intelligible depth information by calculating the time when a return echo is expected and energizing either the transmit or receive mode of the bathymetry system accordingly.

As far back as the early twentieth century, sonar systems have been used to measure the depth of the ocean by timing the round trip travel of an acoustic pulse from a point on the surface to the ocean floor. Presently, bathymetric systems utilize a facsimile type recorder with a known cross-chart sweep-time in conjunction with the sonar transmitter and receiver. By "pinging" at the start of the sweep and marking the chart at the time of the echo return, the time difference can be measured and, from the speed of sound in water, the depth can be computed. If a one-second sweep-time is utilized and the chart calibrated to reflect the normal velocity of an acoustic sonar signal of 800 fathoms per second, the depth can be read directly therefrom in fathoms.

If the water is deeper than 400 fathoms, the echo will return during a one second sweep subsequent to the one in which the "ping" was transmitted. This creates an ambiguity, since it is not readily apparent whether the "ping" which is returning was transmitted during that cycle or some previously transmitted cycle. This problem is generally referred to as "foldover" and must be obviated before intelligible depth information can be received.

As technology progressed, the sonar system was united through an interface with a computer. Since the computer can handle information at a much higher rate than previously accomplished by hand, the foldover problem has become even more substantial. One solution to this problem which has been used in the past is to enable the sonar transmitter only when a pulse is received so as to have no more than one pulse in the water at any time. Such a system is no longer feasible since the data rate for such a system is too low for efficient computer use and, if the sonar system is mounted on a moving ship, a loss of depth information occurs.

Other systems designed to cope with this problem require experienced operators who must constantly monitor the equipment. Such a design introduces a human-error factor, which is extremely high at computer-speed data rates, and is therefore not completely acceptable.

SUMMARY OF THE INVENTION

The general purpose of this invention is to provide an automatic time coding transmit-receive sequence programmer which embraces all the advantages of similarly employed prior art devices and possesses none of the aforedescribed disadvantages. The circuitry of the present invention consists of a pulse identification circuit which is coupled to the sonar system to analyze previously received echo signals and identify each signal that is in the water at any instant of time. The circuit is keyed each second to provide an indication of when a return from the bottom is expected. The echo expected output signal from the pulse identification memory circuit is then fed to the programmer logic circuit which makes the decision as to when the bathymetry system should listen for an expected signal or transmit another pulse. Further circuitry is provided to compare the received echoes with the generated echo expected signal to thereby provide an indication of a missed pulse. This allows the programmer to automatically sequence to a search mode so that information indicative of a rapid increase or decrease in depth will not be obliterated. In addition, if an echo is expected during that part of the normal one second cycle during which the transmitter is enabled, a logic condition is provided by the present invention to immediately switch to a receiver mode.

OBJECTS OF THE INVENTION

Accordingly, it is one object of the present invention to provide a sonar bathymetry system transmit-receive sequence programmer for optimizing intelligible depth information.

Another object of the present invention is the provision of logic circuitry to analyze bathymetry data and selectively enable the transmit modes thereof so as to increase the data rate of incoming signals.

A further object is to provide electronic circuitry which facilitates efficient computerization of bathymetry systems.

An additional object of the present invention is to automatically program the transmit-receive sequence of a bathymetry system to maximize the information data rate.

One further object is the provision of circuitry to analyze depth information from a bathymetry system and automatically override a normal transmit-receive sequence to maximize depth information as the depth of the ocean increases or decreases rapidly.

A still further object of the present invention is to provide a programmer for a bathymetry system so that the system requires minimum supervision.

An additional object is to provide a bathymetry system programmer which increases the number of sonar pulses in the water at any time thereby increasing the alongtrack resolution of the received depth information.

Other objects, advantages and novel features of the invention will become apparent from the following detailed description of the invention when considered in conjunction with the accompanying drawings.

DESCRIPTION OF THE PREFERRED EMBODIMENT

Figure 1:
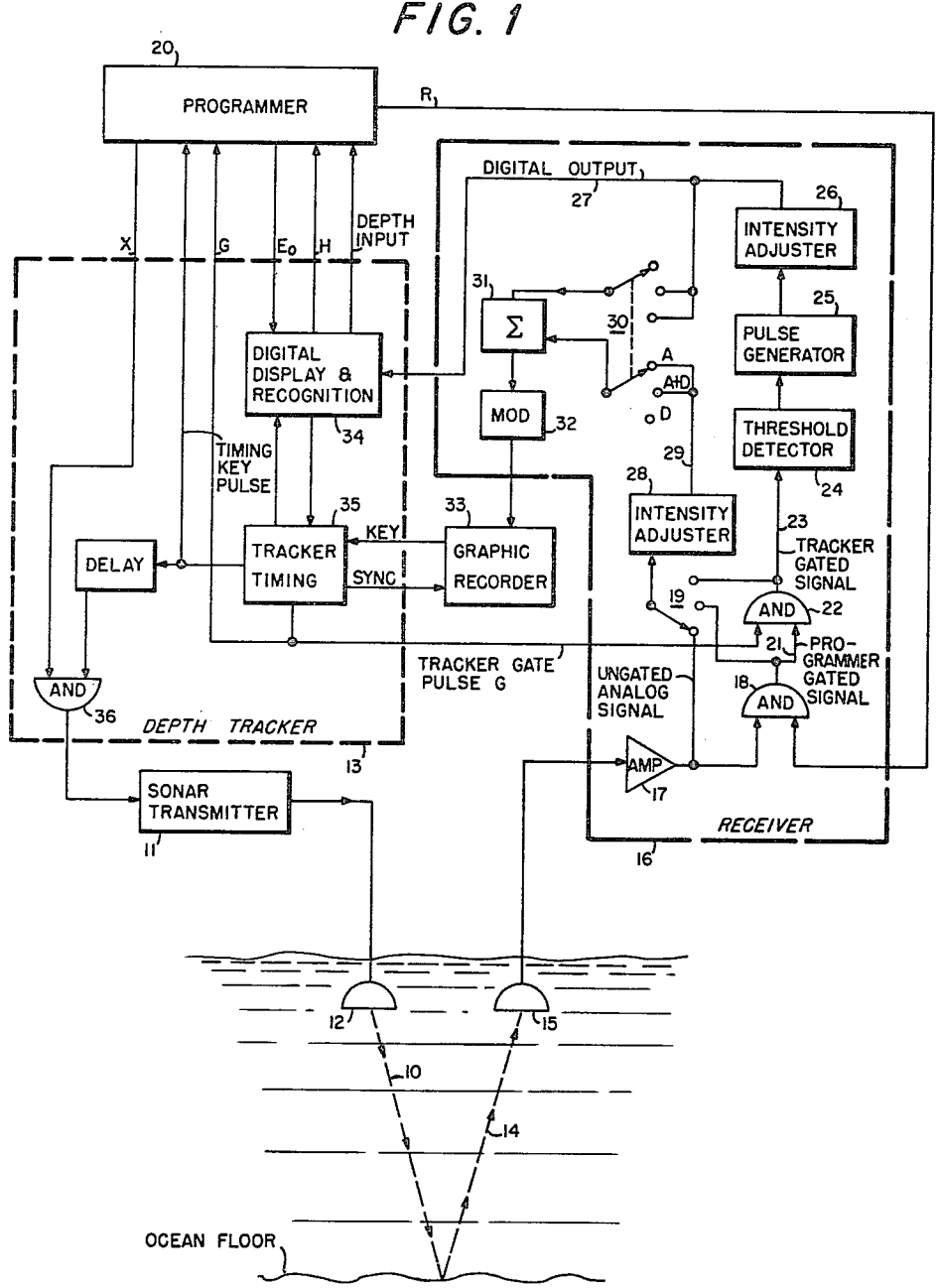
FIG. 1 is a block diagram of a typical bathymetry system utilizing the present invention.

There is shown in FIG. 1, a bathymetry system which utilizes the present invention. Sonar pulses 10 are generated by sonar transmitter 11 and are directed toward the ocean floor by transducer 12 in response to a command signal from depth tracker 13. The echo return pulses 14 are picked-up by transducer 15 and are fed to receiver 16 for processing. The received echo signal is amplified by amplifier 17 and fed to one input of AND logic gate 18 as well as to one contact of three position switch 19. The other input of logic gate 18 is coupled to the receive enable output (designated as R) of the programmer 20 to allow the received echo pulses to appear on line 21 and the middle contact of switch 19, whenever the programmer enables the receive mode. The programmer gated signal on line 21 is fed to AND logic gate 22 to provide a tracker gated output signal on line 23 in a similar manner as gate 18 when a tracker gate pulse (designated as G) appears on the other input of AND gate 22. The tracker gated signal is fed to the input of threshold detector 24 whose output is processed by pulse generator 25 and intensity adjustor 26 to provide the digitalized received output on line 27. The tracker gated signal on line 23 is also fed to the third contact of switch 19. The output of switch 19 is connected to intensity adjustor 28 to provide the analog received signal on line 29. Switch 30 is connected to the digital output line 27 as well as to the analog output line 29 and cooperates with summing circuit 31 to selectively produce either the digital signal, the analog signal, or the sum thereof for processing by modulator 32 and graphic recorder 33 utilizing techniques which are well known in the art.

The digital output signal on line 27 is fed to the depth tracker circuit 13 and, more particularly, to digital display and recognition circuit 34. The display and recognition circuit is coupled to the depth tracker timing circuit 35 which provides synchronization for the entire bathymetry system as well as for the graphic recorder 33. The depth tracker measures the round trip travel time of the acoustic pulse, displays the resultant depth information, and generates logic signals which are fed to the programmer 20.

The first logic signal provided by the depth tracker 13 is the depth input signal, which comprises a set of digital signals, each of which represents a different 400 fathom depth increment. Therefore, if the depth of the ocean as measured by the last received echo is 1200 fathoms, for example, the particular one of the depth input lines corresponding to that 400 fathom increment will be activated while the others will remain in a dormant state. The second signal generated by the tracker 13 is a pulse representative of the receipt of a return echo. This signal is designated as H and will be referred to as the echo heard signal. The third signal is a keying pulse which originates in the tracker timing circuit 35 and occurs once every second to synchronize the programmer with the rest of the system. The fourth signal is the tracker gate signal (designated G) which, as recited above, also functions to gate "on" receiver 16. This pulse also occurs once every second and is centered, on a time scale, on the time of arrival of the next expected echo return, as calculated from the last measured depth reading.

The programmer 20 utilizes these four input signals to, in turn, produce three output signals, in a manner to be more fully described below. The first output signal is designated $E_o$ and indicates that an echo return is expected in the present one second cycle. The second output is designated X and is coupled to AND logic gate 36 to enable the sonar transmitter 11 at a particular time in the one second cycle, as determined by the tracker timing circuit 35. Output X indicates that the system should transmit an acoustic pulse. The third output is designated as R and indicates that the receiver should be enabled at that time to receive an expected echo pulse.

As will become more apparent as the disclosure proceeds, the receiver is enabled when a return pulse coming from the bottom is expected. Similarly, the transmitter will send an additional pulse into the water only when an echo is not expected. In this manner, and by identifying the pulses and keeping track of when they are expected to return, the maximum number of pulses can be placed in the water at any one time so that overall system results, especially with respect to along-track accuracy and resolution, are greatly improved.

Figure 2:
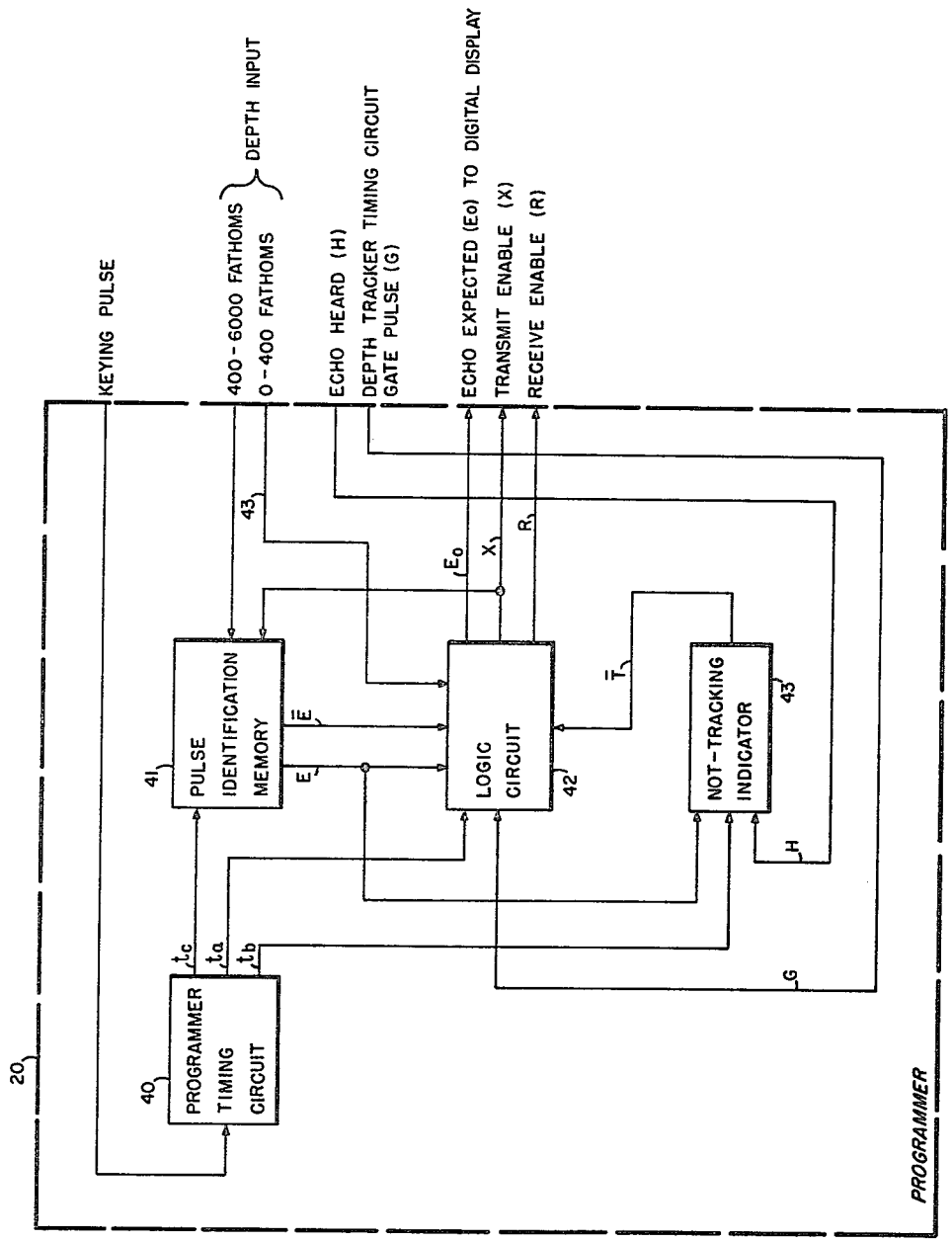
FIG. 2 is a block diagram of a preferred embodiment of the invention.

Referring now to FIG. 2, there is shown a block diagram of the programmer circuit 20 which forms the basis for the present invention. The keying pulse from the depth tracker 13 of FIG. 1, is coupled to the programmer timing circuit 40 which in turn generates three additional timing pulses, $t_c$, $t_a$ and $t_b$, which are fed to the pulse identification memory circuit 41, the programmer logic circuit 42, and the not-tracking indicator circuit 43, respectively. The pulse identification memory 41 receives the depth input signals from the depth tracker and the transmit enable signal X from the logic circuit 42 and produces two output signals, E and $\overline{E}$, which respectively represent the fact that an echo is expected in the next one-second cycle or an echo is not expected in the next cycle. These two signals are fed to the logic circuit 42 as are the depth tracker gating pulse G and a signal, designated as $\overline{T}$, indicative of the fact that a number of echoes has been missed, which signal is generated by the not-tracking indicator circuit 43 at time $t_b$ if a number of echoes were expected and not received. The logic circuit 42 produces the programmer output signals X, R and $E_o$ which are fed to the rest of the bathymetry system as described and shown in FIG. 1.

It is noted that the foldover ambiguity will not arise if the depth of the water is less than 400 fathoms since the round trip of the acoustic pulse will not overlap with another one second cycle. Therefore, the 0–400 fathom depth input line 43 from the depth tracker 13 is fed directly to logic circuit 42 so as to provide a constant enabling pulse to both the transmitter and the receiver of the bathymetry system when the depth of the water is within that range.

Figure 3:
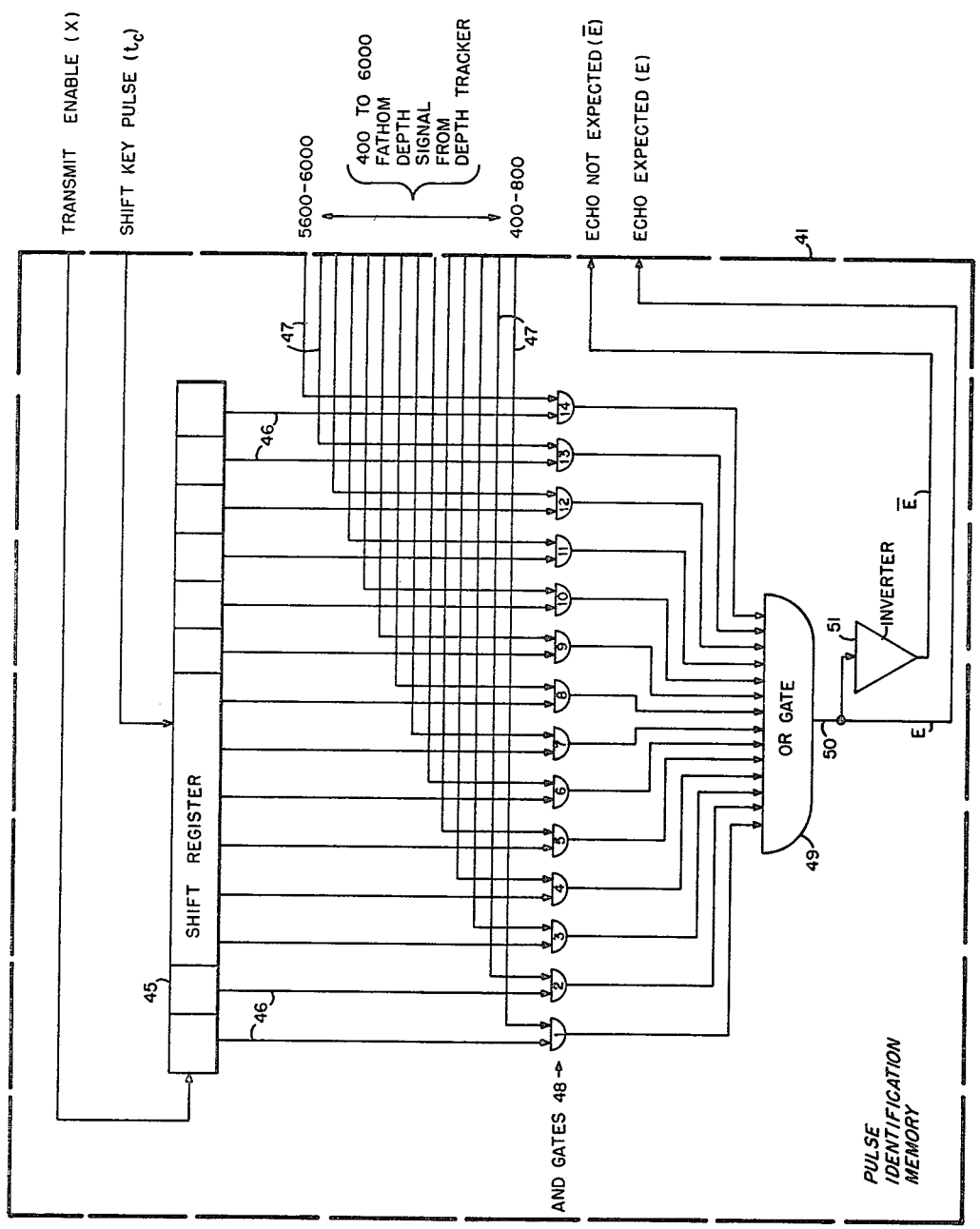
FIG. 3 is a logic diagram of the pulse identification memory circuit utilized in the invention.

In FIG. 3, the pulse identification memory circuit 41 is shown in detail. The transmit enable pulse X from logic circuit 42 is fed to the information input of shift register 45 which has a number of parallel output lines 46 corresponding numerically to the number of depth input lines 47 from the depth tracker 13. The stored digital information in the register 45 is shifted to the right once each cycle by timing pulse $t_c$ from the programmer timing circuit 40. The output lines 46 of the shift register 45 are each connected to one input of one of a number of AND logic gates 48 and the depth input lines 47 are each connected to the other input of the gates. The outputs of the AND gates 48 are fed to a logic OR gate 49 having a single output 50 which indicates that an echo is expected. This signal is designated E. Output 50 is fed to the logic circuit 42, as seen in FIG. 2, and is also negated by inverter 51 to produce the echo not expected signal (designated as $\overline{E}$) which is also coupled to logic circuit 42.

The operation of this circuit will now be explained. Each time the bathymetry system transmits a pulse, an input is fed for storage into the shift register. Each second thereafter, the stored pulse will be shifted to the right one position to produce an output on the output line 46 corresponding thereto. If the depth of the water as measured by the last returned pulse is for example 1000 fathoms, the depth line 47 corresponding to the 800–1200 range will be activated (second line from the bottom). Since an acoustic pulse will take approximately 2½ seconds to make the round trip, in 1000 fathoms of water, the following sequence of events will occur in the register 45. The transmit enable pulse X will be stored in the first or extreme left position of the shift register after the first second and will be shifted to the second position after the second second to produce an output on the second output line 46 at the 2½ second mark. Since both inputs to the second AND gate 48 will then be present, an output will be fed to OR gate 49 which will produce a signal on line 50 indicating that an echo return is expected. In other words, if the depth, as last measured, is 1000 fathoms, and an acoustic pulse was transmitted 2½ seconds ago, the probability is that the depth has not greatly changed and therefore an echo return can be expected. In this manner, all the pulses which are in the water at any time are identified and segregated so that the programmer will be able to maximize the transmit-receive sequencing of the bathymetry system. By utilizing pulse identification memory circuitry typified by the preferred embodiment described above, an extremely accurate indication of when an echo is expected is provided. This allows the bathymetry system to transmit more pulses, i.e., the system data rate is increased.

Figure 4:
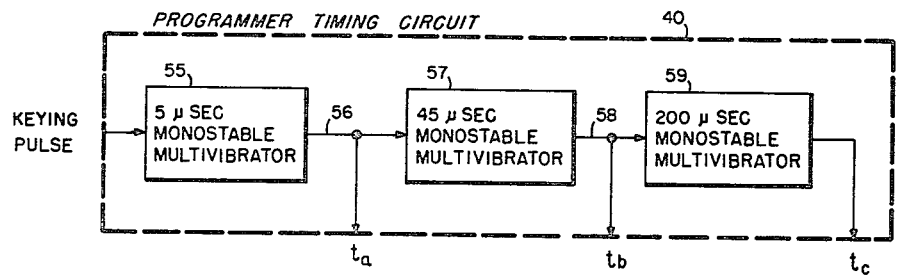
FIG. 4 is a block diagram of the programmer timing circuit.

Continuing now with the other components of the programmer, there is shown in FIG. 4 the programmer timing circuit 40. This circuit takes the keying pulse from depth tracker 13 and applies it to a monostable multivibrator 55 which provides a 5 μsec. duration output pulse to line 56. This pulse is designated as $t_a$ and is fed to logic circuit 42, as shown in FIG. 2. Line 56 is also fed to monostable multivibrator 57 where the trailing edge of pulse $t_a$ initiates a 45 μsec. duration pulse, $t_b$, which is fed via line 58 to monostable multivibrator 59. The trailing edge of this pulse in turn triggers a 200 μsec. pulse labelled $t_c$. The timing circuit 40 functions to synchronize the programmer with the depth tracker and produces the three timing pulses, $t_a$, $t_b$ and $t_c$, once each second upon receipt of the keying pulse from the depth tracker timing circuit 35 (see FIG. 1).

Figure 5:
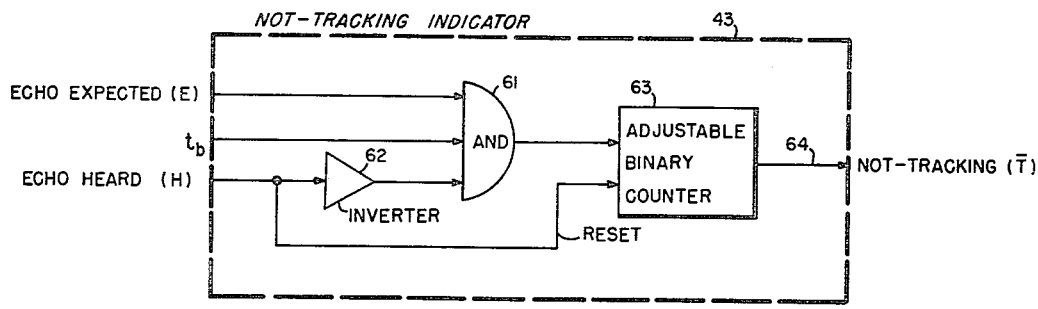
FIG. 5 is a diagram in block form of the not-tracking indicator circuit of FIG. 2.

Referring now to FIG. 5, the echo expected pulse E from pulse identification memory circuit 41 is fed to one input of AND logic gate 61. The echo heard pulse H from the depth tracker 13 is coupled through inverter 62 to a second input of gate 61 while timing pulse $t_b$ is connected to the third input. The output of AND gate 61 is fed to an adjustable binary counter 63 which will provide an output on line 64, designated as $\overline{T}$, after a preset number of cycles have been counted. The echo heard pulse H is also fed to the reset input of the counter to complete the not-tracking indicator circuit.

In operation, whenever the pulse identification memory 41 produces an echo expected signal E at the same time an echo is not heard, i.e., not actually received, the AND logic gate 61 produces an output signal which in effect says that a return echo has been missed. After a certain number of echo pulses have been missed, which number is preselected in counter 63, the not-tracking output $\overline{T}$ will be generated on line 64. If a pulse is subsequently heard, the echo heard pulse H will reset the counter to prepare it for recycling.

Figure 6:
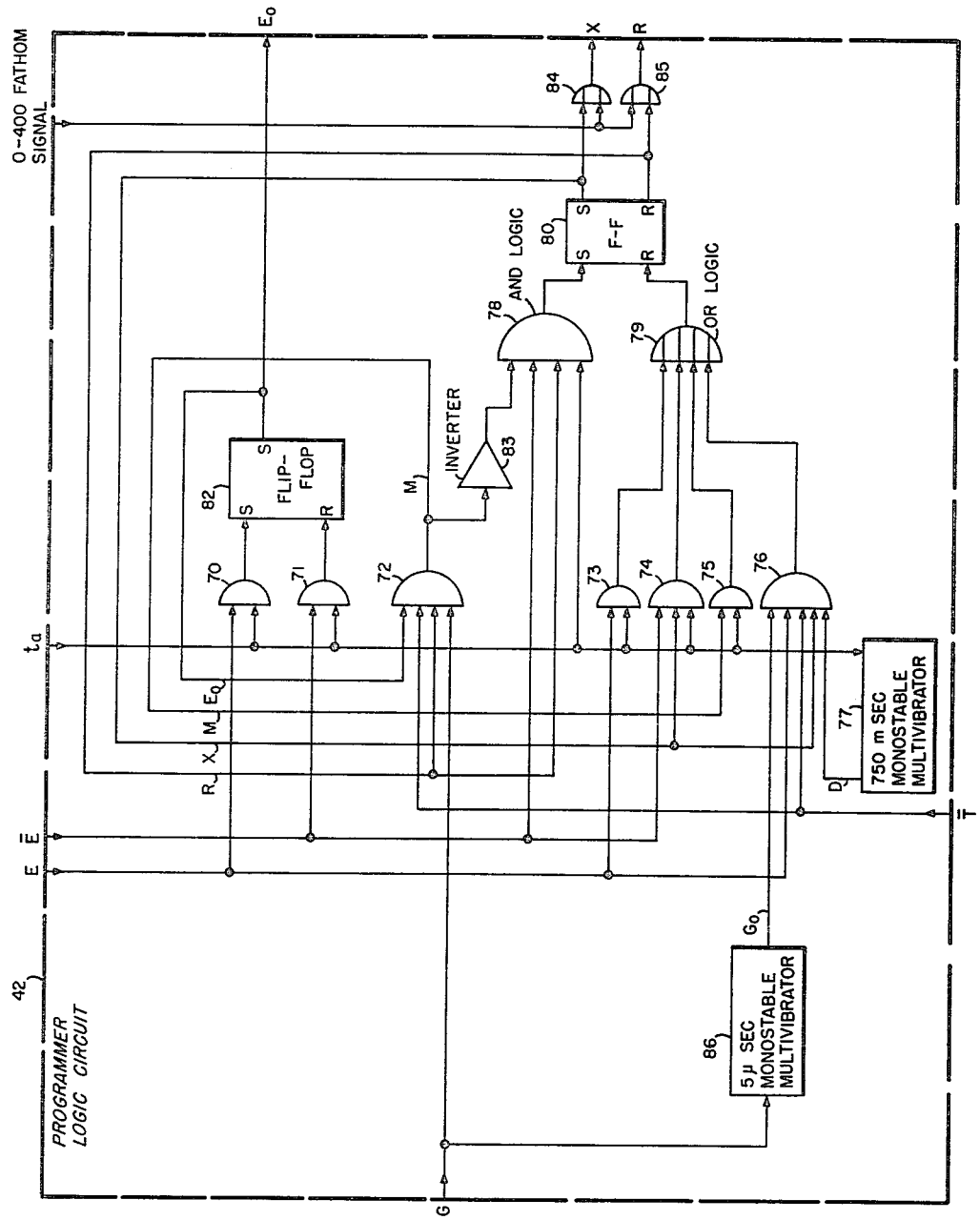
FIG. 6 is a logic diagram of a preferred embodiment of the programmer logic circuit used in the system of FIG. 2.

The heart of the programmer 21 is logic circuit 42, shown in detail in FIG. 6. Timing pulse $t_a$ from timing circuit 40 is fed simultaneously to one input of AND gates 70, 71, 73, 74, 75 and 78. Pulse $t_a$ is also coupled to a 750 msec. monostable multivibrator 77 to produce a pulse, designated D, after ¾ of each one second cycle elapses. AND gates 70 and 71 receive on their other inputs the echo expected signal E and the echo not expected signal $\overline{E}$, respectively. The outputs of gates 70 and 71 are coupled to the set and reset inputs respectively of flip-flop 82 which provides an output $E_o$ on its "set" side, representative of the fact that an echo is expected during the present cycle.

Output $E_o$ is also connected to one input of AND gate 72. Gate 72 also receives at its input side the not-tracking signal $\overline{T}$ from not-tracking indicator 43 (see FIG. 2), the receive mode enable signal R, and the tracker gate pulse G from the depth tracker timing circuit 35 (see FIG. 1). The output of this gate is designated as the M signal (to be explained more fully below) and is fed through inverter circuit 83 to one input of AND logic gate 78. The echo not expected signal $\overline{E}$ and the receive mode enable signal R are also fed to the input side of gate 78. The output of gate 78 is connected to the set input of flip-flop 80 which, when activated, produces the transmit mode enable pulse X which is fed through OR logic gate 84 to the depth tracker circuit 13.

AND gate 73, in addition to receiving timing pulse $t_a$, receives the echo expected signal E from the pulse identification memory circuit 41 to thereby produce an output which is fed to one input of OR logic circuit 79. AND gate 74, which provides an output signal which is coupled to the second input of OR gate 79, receives the transmit enable signal X and the echo not expected signal $\overline{E}$ at its input. AND gate 75 is coupled to the output of AND gate 72 to thereby receive the "M" signal appearing thereon. The final AND gate 76 is coupled to receive the delayed timing pulse D, as well as transmit enable pulse X, not-tracking pulse $\overline{T}$, echo expected pulse E, and a 5 μsec. shortened tracker gate pulse G from the depth tracker 13. The outputs of both AND gates 75 and 76 are coupled to third and fourth inputs, respectively, of OR gate 79. OR gate 79 produces an output, whenever any of its four input signals are present, which output signal is fed to the reset side of flip-flop 80. When the flip-flop 80 is reset, it produces a signal which is fed via OR gate 85 to the receiver 16 (see FIG. 1).

OR gates 84 and 85 also receive the 0–400 fathom depth input signal from digital display and recognition circuit 34 so that both the transmit enable (X) and the receive enable (R) signals will be present when the depth of the water is within that range.

In describing the operation of the transmit-receive sequence programmer, it may be helpful to summarize and tabulate the different logic signals produced by the aforedescribed circuitry.

TABLE 1

Logic Signals

Key pulse = a 1 μsec. pulse occurring once per second.
$t_a$ = a 5 μsec. pulse triggered by the key pulse to trigger the programmer logic circuitry.
$t_b$ = a 45 μsec. pulse triggered by the trailing edge of $t_a$ used to trigger the counting of missed pulses in the not tracking indicator circuit.
$t_c$ = a 200 μsec. pulse triggered by the trailing edge of $t_b$ used to trigger the shift register.
D = a 750 msec. pulse which inhibits AND logic gate 76 for the first ¾ of each cycle.
G = the tracker gate pulse—a pulse occurring once per second having a time duration which is dependent upon the last known depth of the water and is centered on the time of arrival of an expected echo.
$G_o$ = the shortened tracker gate pulse—a short pulse triggered by the tracker gate pulse.
Depth input = the last known depth of the water as represented by binary levels on a number of lines, each one

TABLE 1—Continued of which being indicative of a different 400 fathom depth increment.

H=the echo heard pulse—a 10 msec. pulse which is produced by the depth tracker when an echo is received.

$\overline{T}$=the not tracking signal—a pulse produced by the not-tracking indicator circuit when an echo is expected and not heard after a predetermined number of cycles.

E=the echo expected pulse—produced by the pulse identification memory circuit when an echo is expected to be received by the system in the coming cycles.

$\overline{E}$=the echo not expected pulse—the inverse of the E pulse.

X=the transmit enable pulse—a pulse enabling the bathymetry system to transmit during the next cycle.

R=the receive enable pulse—a pulse enabling the bathymetry system to receive during the next cycle.

Focusing on the logic circuit of FIG. 6, it can be seen that AND gate 78 produces the transmit command while OR gate 79 enables the receive mode. Let us consider first the transmit mode.

The output of AND gate 78, which ultimately results in the transmit enable signal X, will be produced when all four input signals to the gate are present. This can be represented by the following logic formula, where the symbol (·) represents a logic AND statement and the symbol (+) represents a logic OR statement:

$$X = \overline{M} \cdot E \cdot R \cdot t_a$$

Since the "M" condition can be represented by the following:

$$M = E_o \cdot \overline{T} \cdot R \cdot G$$

the negation of M equals:

$$\overline{M} = \overline{E}_o + T + \overline{R} + \overline{G}$$

It therefore follows that the transmit enable signal equals:

$$X = (\overline{E}_o + T + \overline{R} + \overline{G}) \cdot E \cdot R \cdot t_a$$

What this means is that the bathymetry system data rate will be optimized if the system is told to transmit a pulse just subsequent to the occurrence of timing pulse $t_a$ if the receiver was enabled in the previous cycle (R), if an echo is not expected ($\overline{E}$) and either no pulses are missing (T), no signal is expected during the present cycle ($\overline{E}$), no tracker gate pulse exists to open the receiver for the passage of information ($\overline{G}$), or no receive enable pulse exists ($\overline{R}$).

Looking now to the receive mode, OR gate 79 will produce a receive enable command, leading to the generation of receive enable signal R, whenever it receives a signal from any one of AND gates 73, 74, 75, or 76. AND gate 73 produces an output signal according to the following formula:

$$R_1 = E \cdot t_a$$

In other words, the system to be optimized, should receive just after the occurrence of timing pulse $t_a$ whenever an echo is expected in the coming cycle.

The next receive gate, AND gate 74, produces an output under the following conditions:

$$R_2 = \overline{E} \cdot X \cdot t_a$$

This condition says that it is desirable to have the system receive just after $t_a$, even if an echo is not expected in the coming cycle, if the system transmitted an acoustic pulse in the previous cycle. It has been found that in order to more effectively identify the various pulses in the water and to thereby maximize the accuracy of the system, it is advantageous not to transmit two pulses back-to-back. AND gate 74 performs this function.

The third receive gate is gate 75, the output of which can be represented as:

$$R_3 = M \cdot t_a$$

and since:

$$M = E_o \cdot \overline{T} \cdot R \cdot G$$

therefore:

$$R_3 = E_o \cdot \overline{T} \cdot R \cdot G \cdot t_a$$

This seemingly complex receive mode is designed primarily to effectuate the not-tracking feature previously alluded to in the description. By utilizing AND gate 75, the receiver will remain in its actuated state, after $t_a$, when an echo is expected in the present cycle ($E_o$), and the receiver has missed a preset number of pulses ($\overline{T}$), at a time when the receiver was enabled (R), and the depth tracker gate pulse was present to open the receive channel for the reception of an acoustic pulse. In other words, any time a predetermined number of pulses have been missed for one reason or another, the not-tracking feature of the invention will provide a receive enable pulse to override the normal transmit-receive sequence until such missed pulses can be accounted for.

AND gate 76, provides the final receive command signal, and its output logic is as follows:

$$R_4 = E \cdot \overline{T} \cdot X \cdot D \cdot G_o$$

This mode can be referred to as the receive immediately condition and takes into account the fact that at certain depth intervals a pulse return from the ocean floor will be expected during a transmit cycle shortly after it has been initiated. In order to hear this pulse, the system must be sequenced from the transmit mode to the receive mode prior to the beginning of the next cycle. Following the logic formula employed by the invention, the receive enable signal will be provided whenever an echo is expected (E), and the system is not tracking ($\overline{T}$) due to the lack of receipt of a preset number of pulses which have returned during the normal transmit mode, and the system is in the transmit condition (X), and at least ¾ of the transmit cycle has elapsed (D), and the depth tracker gate signal has just been turned on ($G_o$). The first four conditions (i.e., E, $\overline{T}$, X, and D) normally exist prior to the opening of the tracker gate and the shortened tracker gate pulse $G_o$ serves as a timing key pulse to synchronize the system and prevent a timing race.

Thus, the programmer provides automatic sequencing for a bathymetry system, increases the data rate of the system, and increases the accuracy of the received information. The circuitry is quite reliable and effectively replaces the operator previously required in prior art systems.

It is to be understood, of course, that the foregoing disclosure relates to only a preferred embodiment of the invention and that numerous modifications or alterations may be made therein in the light of the above teachings.

What is claimed and desired to be secured by Letters Patent of the United States is:

1. A transmit-receive sequence programmer coupled to a sonar bathymetry system for measuring the depth of a body of water, wherein said bathymetry system produces a periodic keying pulse, a gating pulse (G) once per cycle, said pulse being timewise centered on the expected time of receipt of a return echo, and a gating pulse ($G_o$) triggered by the leading edge of gating pulse G, comprising:

pulse identification memory means for comparing the last known depth of said body of water with the elapsed time of a previously transmitted acoustic pulse to provide a signal indicative of the expectation of a return echo (E) and a signal indicative of the expectation of no return echo ($\overline{E}$);

timing circuit means coupled to said pulse identification memory means, for generating at least one timing pulse ($t_a$) upon the receipt of said periodic keying pulse from said bathymetry system;

a flip-flop coupled to said pulse identification memory means and said timing circuit means for producing and storing an output signal ($E_o$) when signal E is present in said pulse identification memory means at the same time pulse $t_a$ is generated by said timing circuit means;

means for producing an enabling pulse (D) after ¾ of the period of said keying pulse has elapsed;

not-tracking indicator means coupled to said timing circuit means and said pulse identification memory means, for counting the number of acoustic pulses which are expected and have not been received to thereby provide a not-tracking output signal ($\overline{T}$) after a preset count has been reached, and a tracking signal (T) at all other times; and logic circuit means coupled to said pulse identification memory means, said not-tracking indicator means, and said timing circuit means, for producing a transmit enable output signal (X) and a receive enable output signal (R) to said bathymetry system according to the following logic formulas:

$$X = (\overline{E} + T + \overline{R} + \overline{G}) \cdot \overline{E} \cdot R \cdot t_a$$

and $$R = (E \cdot t_a) + (\overline{E} \cdot X \cdot t_a) + (E_o \cdot T \cdot R \cdot G \cdot t_a) + (E \cdot T \cdot X \cdot D \cdot G_o)$$

where the symbols ($\cdot$) and (+) represent logic AND and OR statements, respectively, and a bar ( $^-$ ) over a character represents the negation of the signal represented thereby.

2. The programmer of claim 1, wherein said pulse identification memory means includes:

a shift register having a plurality of parallel output lines, a like plurality of AND logic gates each coupled to receive a respective one of the output lines from said shift register and one of a like plurality of depth information lines from said bathymetry system, and an OR logic gate adapted to receive the output signals from said plurality of AND gates to thereby produce the echo expected signal (E).

3. A transmit-receive sequence programmer coupled to a sonar bathymetry system for measuring the depth of a body of water, comprising:

timing circuit means periodically energized by said sonar bathymetry system to produce first, second and third triggering signals;

pulse identification memory means connected to receive said first triggering signal and functioning to compare the last known depth of said body of water with the elapsed time of a previously transmitted pulse by said sonar bathymetry system to provide an output signal indicative of whether a return echo is expected or not expected;

not-tracking indicator means connected to receive said second triggering signal and said output signal and functioning to count the number of expected echoes that are not received and to provide a not-tracking signal when said count exceeds a predetermined number; and logic means connected to receive said third triggering signal, said output signal and said not-tracking signal and functioning to produce signals which control the transmitter and receiver of said sonar bathymetry system to maximize the accuracy and data rate thereof.

4. The programmer of claim 3 wherein said pulse identification memory means includes:

a shift register having a plurality of parallel output lines and energized by said first triggering signal;

a like plurality of AND gates each coupled to one of said output lines and one of a like plurality of depth information lines from said sonar bathymetry system; and an OR gate connected to receive said AND gates output signals.

References Cited

UNITED STATES PATENTS

| | | | |
|---|---|---|---|
| 2,994,060 | 7/1961 | Ross | 340—3 |
| 3,155,973 | 11/1964 | Smith | 343—7.3 X |
| 3,167,738 | 1/1965 | Westerfield | 340—3 |
| 3,229,288 | 1/1966 | Massey | 343—7.3 X |
| 3,344,421 | 9/1967 | Dildy | 343—7.3 |

RICHARD A. FARLEY, Primary Examiner

U.S. Cl. X.R.

343—7.3, 7.5